United States Patent [19]

Harvey

[11] 3,937,425
[45] Feb. 10, 1976

[54] AIRPLANE WING AND METHOD OF FORMING SAME

[76] Inventor: William B. Harvey, 8932 Footed Ridge, Columbia, Md. 21045

[22] Filed: Apr. 19, 1974

[21] Appl. No.: 462,397

[52] U.S. Cl. .................. 244/123; 156/153; 156/217
[51] Int. Cl.² .......................................... B64C 3/26
[58] Field of Search ............... 244/123; 46/78, 76; 161/161, 159; 264/46.1, 321, 53; 156/217, 227, 153

[56] References Cited
UNITED STATES PATENTS

| | | | |
|---|---|---|---|
| 2,690,151 | 9/1954 | House | 244/123 X |
| 2,715,598 | 8/1955 | Rees et al. | 244/123 UX |
| 2,734,586 | 2/1956 | Wright et al. | 244/123 X |
| 2,797,443 | 7/1951 | Carlson | 264/53 |
| 3,094,449 | 6/1963 | Sisson | 264/46.1 |
| 3,135,486 | 6/1964 | Wing | 244/123 |
| 3,420,363 | 1/1969 | Blicknsderfer | 264/321 |
| 3,502,532 | 3/1970 | Frielingsdorf | 161/161 X |
| 3,645,481 | 2/1972 | Purdy | 244/12 |

Primary Examiner—Trygve M. Blix
Assistant Examiner—Galen L. Barefoot
Attorney, Agent, or Firm—Morton J. Rosenberg

[57] ABSTRACT

A method of forming an airplane wing and a resulting article of manufacture where a wing structural member is provided which is composed of a plastic foam layer sandwiched between opposing paper sheets. A substantial portion of one of the paper sheets is removed from the plastic foam through application of water to pulpify one of the paper sheets and then stripping such from the plastic foam layer. The resulting structural member is then formed into a predetermined contour after compression of the foam layer in the leading edge region of the wing. Rib elements may be secured to an internal surface of the wing and the trailing edges are tapered prior to securement of the trailing wing edges throughout the wing extended length.

21 Claims, 9 Drawing Figures

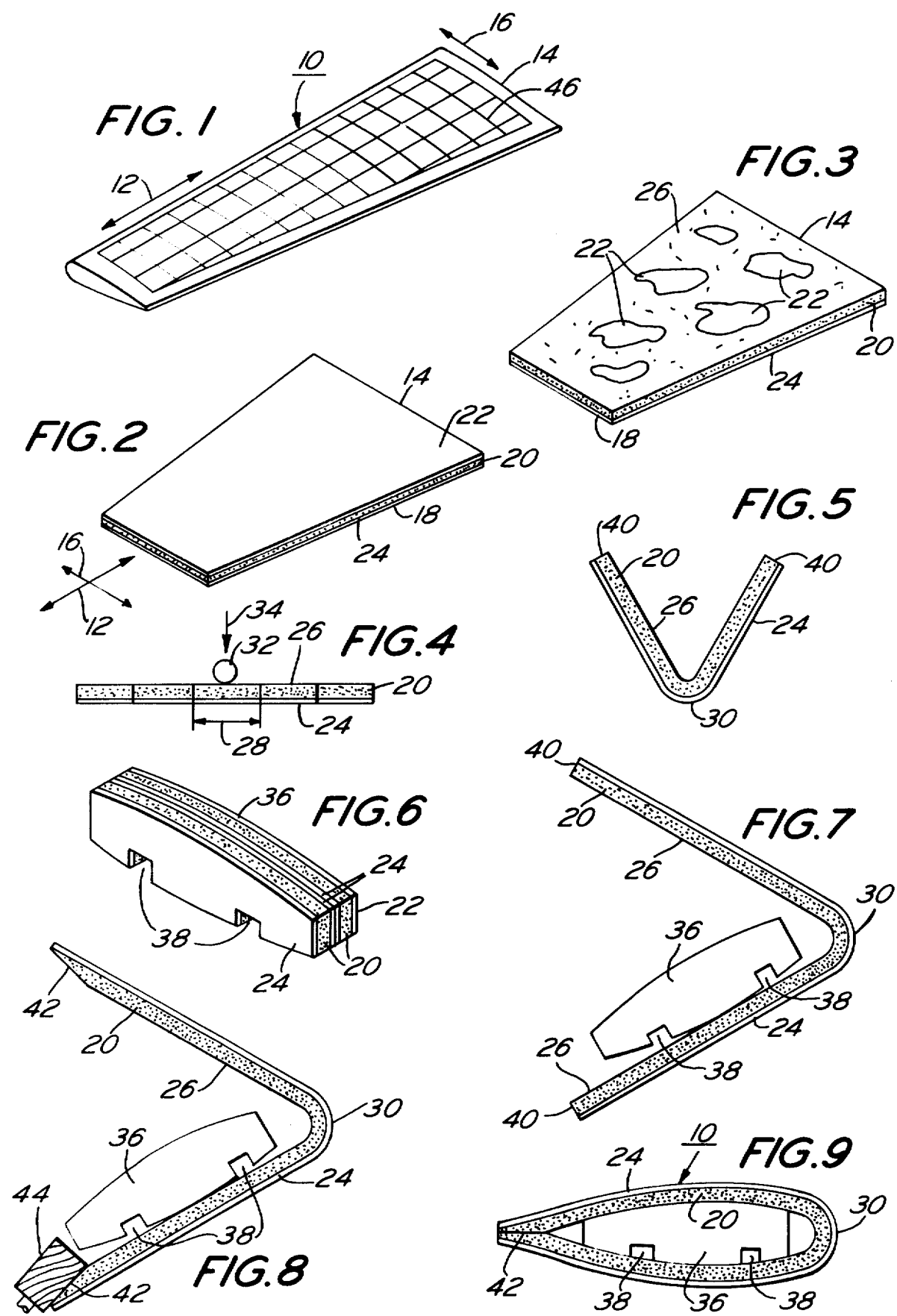

AIRPLANE WING AND METHOD OF FORMING SAME

BACKGROUND OF THE INVENTION

1. Field of the Invention

This invention pertains to a method of forming airplane wings and the resulting article of manufacture. Further, this invention relates to methods of forming airplane wings from a structural member composed of plastic foam sandwiched between opposing paper sheets. In particular, this invention pertains to methods of forming airplane wings utilizing structural elements of plastic foam and paper sheets which may be easily contoured into an aerofoil shape.

2. Prior Art

Airplane wings and methods of forming the same for use in model aircraft are well known in the art. In some prior wing constructions, such have been made of foam material having a fiberglass coating. Such wing elements have been found to be often times structurally deficient and incapable of withstanding the static and dynamic loads imparted to the wing during use. Further, in some prior wings of this type, the wing surfaces are deformable upon contact.

Other prior wings have been constructed utilizing foam core having outer surfaces composed of veneer, vinyl, cardboard, and balsa. However, such prior wing sections have been found also to be sometimes structurally deficient during use. Other wings in prior use are commonly referred to as built-up wings composed of structural elements covered with various fabrics or Mylar. However, such wing members are often fragile and do not provide a continuous hardened surface between structural rib elements forming the wing. In some cases, prior wing members have been made of honeycomb structural elements to provide a light and structurally sufficient member, however, such wing elements have been found to be relatively difficult and expensive to construct.

SUMMARY OF THE INVENTION

A method of forming an airplane wing which includes the step of providing a planar structural member composed of plastic foam between opposing paper sheets. A substantial portion of one of the paper sheets is removed from the plastic foam. The structural member is then formed into a predetermined contour and opposing ends of the structural member are secured each to the other to form the airplane wing in a desired aerofoil contour.

BRIEF DESCRIPTION OF THE DRAWINGS

FIG. 1 is a perspective view of a completed airplane wing;

FIG. 2 is a perspective view of a planar structural member having been cut to a predetermined contour;

FIG. 3 is a perspective view of the structural member having one of the paper sheets substantially removed from the foam layer;

FIG. 4 is an end view of the structural member being compressed in a leading wing edge region;

FIG. 5 is an end view of the wing structural member being bent into a substantially V-shaped contour;

FIG. 6 is a perspective view of a rib element;

FIG. 7 is an elevational view of the structural member having a rib element attached to an internal surface thereof;

FIG. 8 is an elevational view of the structural member having the trailing edges tapered by a roller; and, FIG. 9 is an elevational view of the wing section after securement of the trailing edges.

DESCRIPTION OF THE PREFERRED EMBODIMENTS

Referring now to FIG. 1, there is shown airplane wing 10 which extends in longitudinal direction 12 and is adapted to be mounted to the side of a fuselage of an airplane having an interface along wing surface 14. The method of forming a resultant airplane wing 10 article of manufacture as will be described in the following paragraphs, provides for an airplane wing design which has high structural integrity, low weight and is economical to manufacture. The resulting wing 10 may be used in the construction of model aircraft to produce an aerofoil member which is capable of withstanding both static and dynamic structural loading inherent to the airplane structure as well as the stresses imposed when in flight.

The initial step in forming airplane wing 10 is shown in FIG. 2 where planar structural member 18 is provided. Structural member 18 is generally composed of a plastic foam layer 20 which is sandwiched between opposing paper sheets 22 and 24. In general, structural member 18 includes plastic foam layer 20 composed of an open cell plastic foam having an upper and lower surface which is secured to paper sheets 22 and 24. Sheets 22 and 24 are generally formed of a hard clay coat paper. This type of structural member 18 is well known in the art and is commonly referred to as Featherweight Mounting Board and is also commercially purchaseable under the name Foam Core. One such type of structural member 18 comprising polystyrene foam layer 20 and paper laminate sheets 22, 24 used in forming wing 10 is produced by Monsanto Chemical Co., Plastics Division, St. Louis, Missouri. Structural members 18 are generally commercially available in rectangularly contoured segments. Thus, the initial step of providing planar structural member 18 includes the step of establishing a planar contour of airplane wing 10. This may be achieved by cutting a standard rectangular segment of member 18 to a predetermined flattened contour of airplane wing 10 which would result in a predetermined aerofoil contour after completion of the construction of wing 10, as is shown in FIG. 9.

The next succeeding step in forming the wing 10 is shown in FIG. 3 where a substantial portion of paper sheet 22 is removed from an upper surface of plastic foam layer 20. In this step, structural member 18 may be placed on a flattened surface for interfacing with lower paper sheet surface 24. Upper paper sheet 22 may then be removed from layer 20 through a number of well known techniques. One such technique used successfully is through milling sheet 22 from layer 20. In this step, a milling head or other suitable milling device is gradually lowered into contact with an upper surface of sheet 22. The milling head may then be lowered while being moved cyclically throughout the contour of planar structural member 18. Similarly, the milling head may be maintained relatively stationary while member 18 is movably actuated. In any case, the milling head or other scraping device is gradually lowered to provide a general wearing away or tearing of sheet 22 until a substantial portion thereof has been removed from layer 20.

Other dry methods of removing sheet 22 include use of a grinding wheel, manual scraping tool such as a chisel, sandpaper or other devices relying on frictional engagement of the removing tool with sheet 22. As in the case of utilizing the milling operation, the important concept is that a substantial portion of sheet 22 be removed from layer 20.

In another embodiment of the invention water is applied to upper paper sheet layer 22 in order to pulpify paper sheet surface 22. In general, the water applied to structural member 18 in this step is heated and is maintained above room temperature, although such is not necessarily critical to the inventive concept as is herein detailed. Surface 22 may be rubbed with a water impregnated member such as a sponge or some like device. Once upper paper sheet 22 is visually observed to be in a pulpified state, it is stripped from plastic foam layer 20. The stripping step may be accomplished manually or through some apparatus which causes increased rubbing of the now pulpified upper paper sheet 22. At the completion of the stripping step, a substantial proportion of paper sheet 22 is seen to have been removed from upper surface 26 of plastic foam layer 20. As seen in FIG. 3, this may result in small portions of paper sheet 22 remaining attached to upper surface 26. However, in general, the remaining paper sheet 22 covers substantially less than one-half of the surface area of upper plastic foam layer surface 26. Thus, at the end of this step, a substantial portion of paper sheet 22 has been removed from plastic foam layer 20 as is shown in FIG. 3.

A flattened leading edge wing region width 28 is established, as is shown in FIG. 4, such that wing 10 may be subsequently bent to form wing leading edge 30 as is shown in FIGS. 7–9. Roller 32, extending in longitudinal direction 12 throughout the extension of wing 10 is compressively interfaced with upper surface 26 of foam layer 20 in a vertically downward direction as is shown by directional arrow 34. Roller 32 is movably actuated in reversible transverse direction 16 throughout width 28 in order to depress foam layer 20 throughout the leading edge region defined by width 28. Although not important to the inventive concept, a one inch diameter roller has been successfully utilized in practice. Further, compression loads of 10–25 pounds have been successfully utilized in compressing the foam layer 20 in this step of the overall process. Thus, at the conclusion of the application of pressure, through actuation of roller 32, or some like apparatus, layer 20 is seen to be slightly compressibly deformed or depressed and pliable in the area of wing leading edge 30.

After being compressed, structural member 18 is bent around leading edge region 30 into a substantially V-shaped contour as is shown in FIG. 5. This bending or contouring of member 18 may be accomplished manually or through application of a die member about which wing 10 is shaped. In order to provide structural integrity to the completed wing 10, rib elements 36 may be contoured in predetermined fashion and mounted to member 18. Rib elements 36 are geometrically contoured to interface with surface 26, of foam layer 20 in a manner determined by the overall aerofoil shape of the finally completed wing section as shown in FIG. 9. Rib elements 36 may be formed of a laminate of plastic foam layer 20 between opposing paper sheets 22 and 24 being composed of the same material as structural member 18. Thus, rib elements 36 would substantially have a width approximately twice that of structural member 18. Further, regarding the laminate interface, opposing sheets 24 may be contact cemented each to the other in order to form a more secure rib element 36. Additionally, in order to provide the ability to utilize spar elements in wing 10, spar cut out regions 38 may be formed in the laminate rib elements 36. As is seen in FIG. 7, rib elements 36 may then be contact cemented to upper surface 26 of structural member 18. Although not of critical importance, the contact cement used generally has a water base such that foam layer 20 is not dissolved during the cementing operation. In general, ribs 36 are rocked into place in order to accommodate the curvature of the lower surface of each rib element 36.

In another embodiment of the present invention, rib slots may be formed in layer 20 of structural member 18 for accommodation of ribs 36. The rib slots would pass in direction 16 and be displaced each from the other by a predetermined distance in direction 12 through the longitudinal extension of wing 10. Each of the slots have a width substantially equal to but slightly in excess of the width of rib elements 36. Thus ribs 36 may be inserted in respective rib slots and cemented, glued or otherwise bonded or mounted within structural member 18 in predetermined fashion to provide the appropriate contour of wing 10.

Wing trailing edges 40 are then tapered into a contour as shown in FIG. 8 along tapered trailing edge contour 42. The tapering of trailing edges 40 may be accomplished through actuation of an inclined roller 44 in longitudinal direction 12 as is shown. In this manner the trailing edge region of wing 10 is compressively deformed prior to the securement of edges 40 along tapered contour 42 as is shown in FIG. 9. Finally, opposing trailing edges 40 are secured in longitudinal direction 12, each to the other, as is shown in FIG. 9 by application of contact cement or through some like mechanism. Thus, airplane wing 10 as shown in FIG. 1 is formed by the method steps as illustrated in FIGS. 2–9. The resulting article of manufacture provides for airplane wing 10 composed of plastic foam layer 20 having at least one paper sheet 24 secured to a surface of layer 20. The combined plastic foam layer 20 and paper sheet 24 is contoured into a predetermined aerofoil shape to form a wing leading edge 30 and a pair of trailing wing edges 40 with the trailing wing edges 40 being securely fastened each to the other along a longitudinal extension 12 of the airplane wing 10.

In another embodiment of the invention, after compressively deforming trailing edges 40, it has been found advantageous to secure edges 40 along contour 42 through the application of heat to produce a weld effect. In this embodiment of the present invention, heated rollers, hot iron, or other heating elements contact the upper surface of paper sheet 24 above and/or below the compressively deformed trailing edges 40. The heating elements are passed in longitudinal direction 12 throughout the extension of wing 10. The temperature of the heating elements in actual practice have been found to approximate a temperature of 400°F. However such is not important to the inventive concept with the exception that the heating element be of a sufficiently high temperature to melt foam layer 20 in the area of the trailing edges compressively deformed foam layer, as well as the temperature being lower than the combustion temperature of paper sheet 24. In this manner, opposing foam layers in the neighborhood of trailing edges 40 melt into each other substantially along contour 42. It is to be understood that in like manner, as has been described, rib elements 36 may be welded into rib slots through the application of heating elements to paper surface 24 and the passage of such in direction 12.

It is to be understood that wing 10 may be formed to have a pleasing visual effect through the application of a clear lacquer applied to lower paper sheet 24 prior to the bending step. Further, indicia or other designs 46 may be silk screened or otherwise placed on the surface of paper sheet 24 in a manner desired by the user.

While the invention has been described with certain specific embodiments thereof, it will now be understood that further modifications will suggest themselves to those skilled in the art, and it is intended to cover such modifications within the scope of the appended claims.

What is claimed is:

1. A method of forming an airplane wing including the steps of:
   a. providing a planar structural member composed of plastic foam between opposing paper sheets;
   b. removing a substantial portion of one of said paper sheets from said plastic foam to form an inner surface of said airplane wing composed of said plastic foam and said paper sheet;
   c. establishing a leading edge region of said wing extending a predetermined transverse distance with respect to a longitudinal extension of said structural member;
   d. compressing said leading edge region throughout said longitudinal extension of said planar structural member;
   e. shaping said structural member into a predetermined contour; and,
   f. securing opposing ends of said structural member each to the other to form said airplane wing.

2. The method of forming an airplane wing as recited in claim 1 where the step of providing a planar structural member includes the step of establishing a planar contour of said airplane wing.

3. The method of forming an airplane wing as recited in claim 2 where the step of establishing a planar contour is followed by the step of cutting said structural member to said contour of said airplane wing.

4. The method of forming an airplane wing as recited in claim 1 where said plastic foam is formed of open cell plastic foam.

5. The method of forming an airplane wing as recited in claim 4 where said paper sheets are formed of hard clay coating paper.

6. The method of forming an airplane wing as recited in claim 1 where the step of removing one of said paper sheets includes the step of frictionally engaging said paper sheet to be removed throughout a contour of said planar structural member.

7. The method of forming an airplane wing as recited in claim 6 where the step of frictionally engaging said paper sheet includes the step of milling said paper sheet from said plastic foam.

8. The method of forming an airplane wing as recited in claim 6 where the step of frictionally engaging said paper sheet includes the step of grinding said paper sheet from said plastic foam.

9. The method of forming an airplane wing as recited in claim 1 where the step of removing one of said paper sheets includes the step of applying water to a surface of at least one of said paper sheets.

10. The method of forming an airplane wing as recited in claim 9 where the step of applying water includes the step of providing heated water to be applied to said surface of said paper sheet.

11. The method of forming an airplane wing as recited in claim 10 where the step of applying water includes the step of sponging said heated water over said surface of said paper sheet.

12. The method of forming an airplane wing as recited in claim 10 where the step of applying water includes the step of rubbing said surface of said paper sheet with a water impregnated member.

13. The method of forming an airplane wing as recited in claim 12 where the step of rubbing includes the step of pulpifying at least a portion of said paper sheet having said heated water applied thereto.

14. The method of forming an airplane wing as recited in claim 13 where the step of pulpifying is followed by the step of stripping a substantial portion of said paper sheet from said plastic foam.

15. The method of forming an airplane wing as recited in claim 1 where the step of compressing includes the step of applying pressure to said leading edge region on a surface of said structural member having said substantial portion of said paper sheet removed from said plastic foam.

16. The method of forming an airplane wing as recited in claim 15 where the step of applying pressure includes the step of compressing said plastic foam in said leading edge region.

17. The method of forming an airplane wing as recited in claim 16 where the step of compressing includes the step of bending said structural member around said leading edge region, said surface of said structural member having said substantial portion of said paper sheet removed forming an interior surface of said wing.

18. The method of forming an airplane wing as recited in claim 1 where the step of shaping said structural member is followed by the step of adding structural integrity to said formed structural member.

19. The method of forming an airplane wing as recited in claim 18 where the step of adding structural integrity includes the step of contouring at least one rib member for attachment to an internal surface of said structural member having a substantial portion of said paper sheet removed from said plastic foam.

20. The method of forming an airplane wing as recited in claim 1 where the step of securing opposing ends includes the step of tapering said opposing ends of said structural member to form a pair of longitudinally extending tapered edges.

21. The method of forming an airplane wing as recited in claim 20 where the step of tapering is followed by the step of fastening said tapered edges each to the other throughout said longitudinal extension.

* * * * *